United States Patent
Hensleigh et al.

(10) Patent No.: US 10,668,708 B2
(45) Date of Patent: Jun. 2, 2020

(54) OPTICALLY ENHANCED PATTERNABLE PHOTOSENSITIVITY VIA OXYGEN EXCITATION

(71) Applicant: Lawrence Livermore National Security, LLC, Livermore, CA (US)

(72) Inventors: Ryan Hensleigh, Colstrip, MT (US); Eric Duoss, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 259 days.

(21) Appl. No.: 15/277,645

(22) Filed: Sep. 27, 2016

(65) Prior Publication Data

US 2018/0086007 A1    Mar. 29, 2018

(51) Int. Cl.
| | |
|---|---|
| *B29C 64/264* | (2017.01) |
| *B33Y 50/02* | (2015.01) |
| *B33Y 10/00* | (2015.01) |
| *B33Y 30/00* | (2015.01) |
| *B29C 64/386* | (2017.01) |
| *B29C 64/20* | (2017.01) |

(Continued)

(52) U.S. Cl.
CPC .......... *B33Y 50/02* (2014.12); *B29C 64/124* (2017.08); *B29C 64/135* (2017.08); *B29C 64/20* (2017.08); *B29C 64/264* (2017.08); *B29C 64/386* (2017.08); *B33Y 10/00* (2014.12); *B33Y 30/00* (2014.12)

(58) Field of Classification Search
CPC .... B29C 67/0066; B29C 64/264; B33Y 10/00
See application file for complete search history.

(56) References Cited

U.S. PATENT DOCUMENTS

| | | | | |
|---|---|---|---|---|
| 5,236,326 | A | * | 8/1993 | Grossa .................. B29C 64/135 118/620 |
| 5,573,889 | A | * | 11/1996 | Hofmann .................. C08F 2/48 430/285.1 |

(Continued)

OTHER PUBLICATIONS

Pham, D.T. and Gault, R.S., 1998. A comparison of rapid prototyping technologies. International Journal of machine tools and manufacture, 38(10-11), pp. 1257-1287.<https://www.sciencedirect.com/science/article/pii/S0890695597001375> (Year: 1998).*

(Continued)

*Primary Examiner* — Leith S Shafi
*Assistant Examiner* — Nicholas R Krasnow
(74) *Attorney, Agent, or Firm* — Harness, Dickey & Pierce, PLC

(57) ABSTRACT

A method is disclosed for performing a three dimensional (3D) printing process. The method involves generating a primary light beam having a wavelength sufficient to initiate polymerization of a photoresin, and patterning the primary light beam into a patterned primary beam. The patterned primary beam may be directed toward an ultraviolet (UV) or visible light sensitive photoresin to initiate polymerization of select areas of the photoresin. The photoresin may be illuminated with a secondary light beam having a wavelength of about 765 nm to stimulate triplet oxygen into singlet oxygen, to thus control oxygen inhibition in additional areas bordering the select areas, to control polymerization inhibition in the additional areas bordering the select areas.

19 Claims, 2 Drawing Sheets

Figure 1:
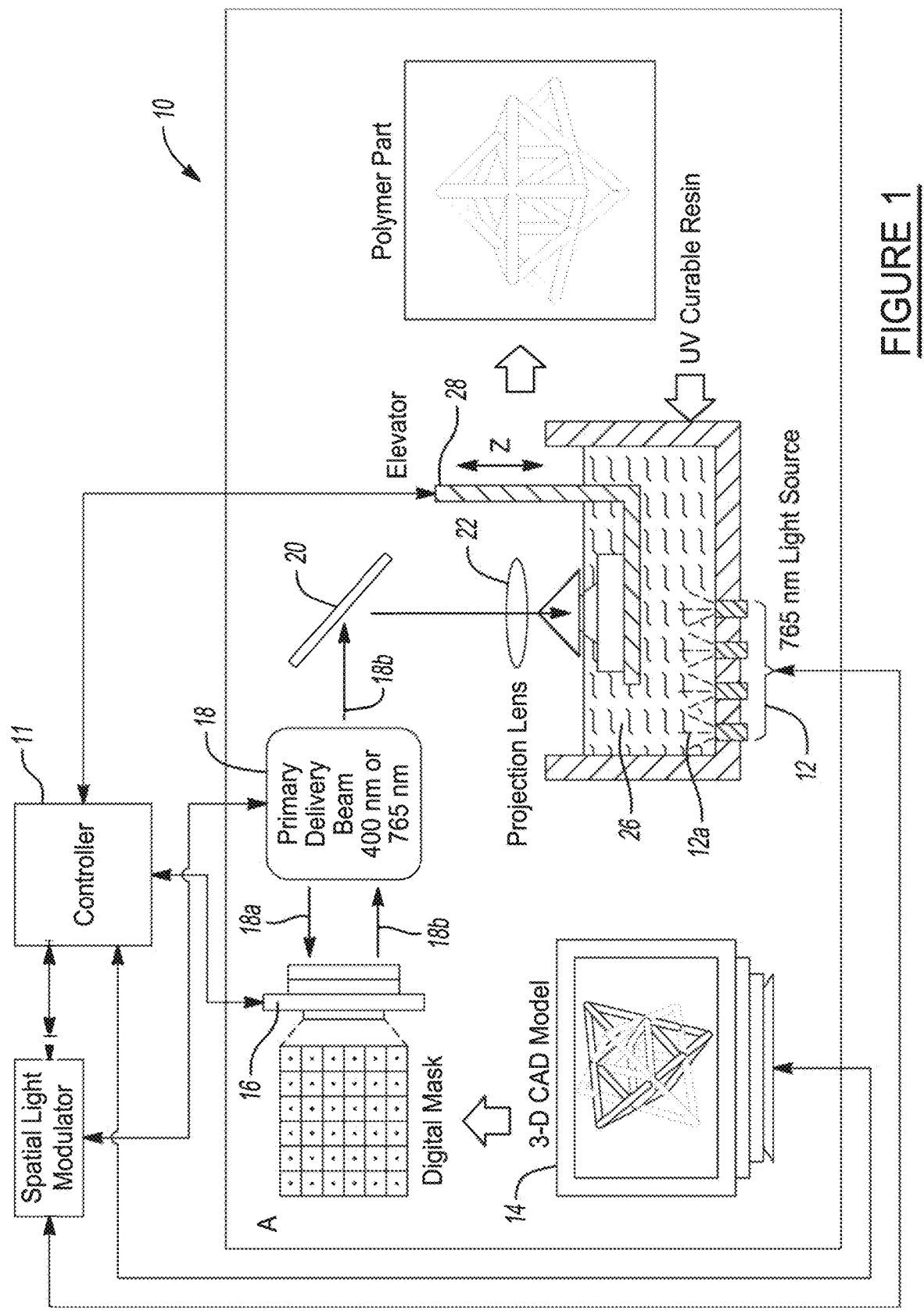

(51) Int. Cl.
*B29C 64/135* (2017.01)
*B29C 64/124* (2017.01)

(56) References Cited

U.S. PATENT DOCUMENTS

| | | | | |
|---|---|---|---|---|
| 5,849,459 A * | 12/1998 | Hagiwara | ............. | G03F 7/0037 |
| | | | | 430/280.1 |
| 7,141,615 B2 | 11/2006 | Scranton et al. | | |
| 9,120,270 B2 * | 9/2015 | Chen | ..................... | B29C 64/129 |
| 2002/0171178 A1 * | 11/2002 | Dean | ........................ | A61F 2/28 |
| | | | | 264/401 |
| 2004/0152801 A1 * | 8/2004 | Scranton | ................... | C08F 2/38 |
| | | | | 522/184 |
| 2013/0076857 A1 * | 3/2013 | Kurashige | .............. | G02B 27/48 |
| | | | | 348/40 |
| 2016/0067827 A1 * | 3/2016 | Zediker | ................ | B23K 26/342 |
| | | | | 219/76.12 |
| 2016/0067921 A1 * | 3/2016 | Willis | ................... | B29C 64/124 |
| | | | | 264/401 |
| 2017/0120515 A1 * | 5/2017 | Rolland | ................ | B33Y 10/00 |
| 2017/0182556 A1 * | 6/2017 | Ramaswamy | .......... | B29C 64/20 |
| 2017/0203364 A1 * | 7/2017 | Ramaswamy | .......... | B28B 1/001 |
| 2018/0133954 A1 * | 5/2018 | Watanabe | ................ | B29C 67/00 |
| 2018/0264726 A1 * | 9/2018 | Shiomi | ................... | B22F 3/105 |

OTHER PUBLICATIONS

Bregnhøj, Mikkel, et al. "Direct 765 nm Optical Excitation of Molecular Oxygen in Solution and in Single Mammalian Cells." The Journal of Physical Chemistry B 119.17 (2015): 5422-5429.

Ligon, Samuel Clark, et al. "Strategies to reduce oxygen inhibition in photoinduced polymerization." Chemical Reviews 114.1 (2013): 557-589.

Wilkinson, Francis. et al. Rate Constants for the Decay and Reactions of the Lowest Electronically Excited Singlet State of Molecular Oxygen in Solution. An Expanded and Revised Compilation, Journal of Physical and Chemical Reference Data 24, 663 (1995); doi: 10.1063/1.555965.

Meng, Xiaoyu, et al. "Design and optimization of a light-emitting diode projection micro-stereolithography three-dimensional manufacturing system." Review of Scientific Instruments 83.12 (2012): 125001.

* cited by examiner

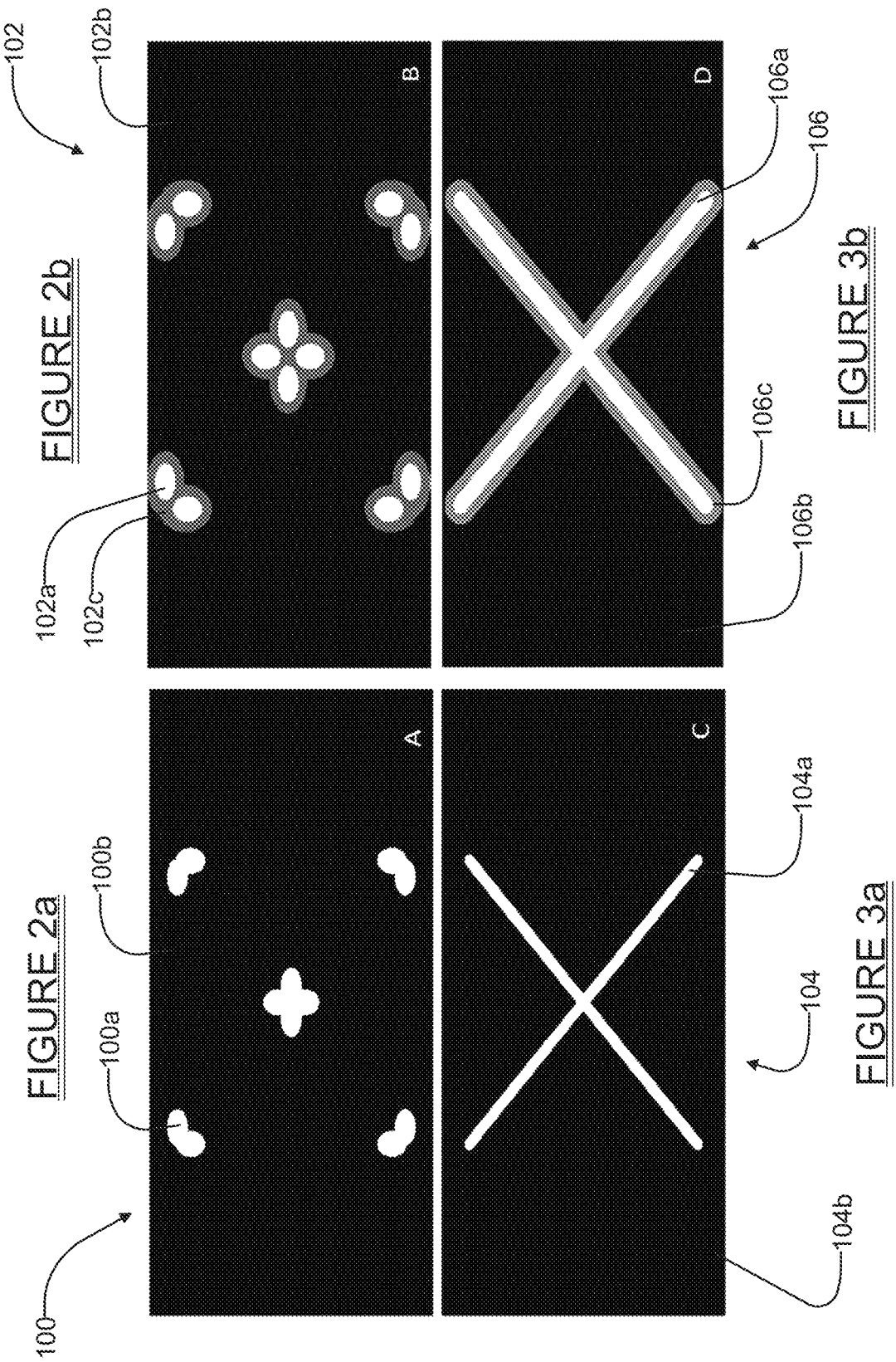

OPTICALLY ENHANCED PATTERNABLE PHOTOSENSITIVITY VIA OXYGEN EXCITATION

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to method of unpatterned or patterned light to enhance photosensitivity of a photoresin, and more particularly to a method for patterning light by exciting triplet oxygen to singlet oxygen for use in photopolymerization and 3D printing systems.

BACKGROUND

This section provides background information related to the present disclosure which is not necessarily prior art.

Free radical photopolymerization is a common materials fabrication technique used in coatings, microfabrication, and 3D printing, in particular stereolithography. Under ambient conditions molecular oxygen is present in the photopolymerizing material, called the photoresin. When light hits the photoresin, free radicals induce polymerization and solidification. Typically molecular oxygen exists in a triplet quantum state under normal conditions, and reacts with the free radicals to terminate the polymerization reaction, known as oxygen inhibition.

Oxygen inhibition can outright prevent certain liquid photoresins from polymerizing, a major problem for coatings performed under ambient conditions. Oxygen inhibition also has major effects on 3D printing processes, like stereolithography, such as limiting network density and feature accuracy. However, oxygen inhibition can also be useful to stop the reaction if controlled properly.

Several methods have been developed in order to control oxygen inhibition; the majority being summarized by Ligon et al. ("*Strategies to Reduce Oxygen Inhibition in Photoinduced Polymerization*", Chem. Rev. 2014, 114, pp. 557-589). Methods typically include performing polymerization under inert, nitrogen, atmospheres which requires pressurized gasses and suitable plumbing. Another method is incorporation of photosensitive chemicals, called photosensitizers. Photosensitizers when irradiated with light, of a wavelength unique to the photosensitizer, react with triplet oxygen to form singlet oxygen. Triplet and singlet oxygen have different chemistries, with singlet oxygen being more reactive than triplet oxygen. This increase in reactivity allows singlet oxygen to react with substrates typically unaffected by triplet oxygen giving it several uses including in photodynamic therapy, sterilization, and fine chemical synthesis summarized by DeRosa et al. ("*Photosensitized singlet oxygen and its applications*", Coord. Chem. Rev. 2002, 233-234, pp. 351-371). Certain chemicals are used, called quenchers, which do not react with triplet oxygen, but do react with singlet oxygen, and can be used to remove oxygen from the photoresin. The quenched oxygen can no longer participate in oxygen inhibition of radical polymerization, allowing the reaction to proceed uninhibited until new oxygen diffuses in and inhibits the reaction. The light used to stimulate the photosensitizes, create singlet oxygen, and prevent oxygen inhibition is uncoupled from the polymerization which typically occurs at a different wavelength. Scranton et al. ("*Photochemical Method to Eliminate Oxygen Inhibition of Free Radical Polymerizations,*" Nov. 28, 2006, U.S. Pat. No. 7,141,615 B2) describes the use of photosensitizers to control oxygen inhibition during photopolymerization.

All of the above discussed techniques used to control oxygen inhibition have a common drawback in that they rely on photosensitizers to excite triplet oxygen to single oxygen, and they lack spatial-temporal control.

Lithography and additive manufacturing are continually driving toward greater control over features size and being able to manufacture these features over large areas. Spatial temporal control of where oxygen inhibition occurs would be highly valuable in order to gain an even greater degree of control over the size of features of additively manufactured parts. This is especially important because as the manufacturing footprint of the part grows, it becomes increasingly difficult and expensive to control oxygen inhibition by inert atmospheres as has been done traditionally. Oxygen can be thought of as a naturally occurring ambient polymerization inhibitor, and previous work has shown that spatial temporal control of inhibitor can lead to resolutions beyond the abbe diffraction limit summarized in the work of Scott et al. ("*Two-Color Single-Photon Photoinitiation and Photoinhibition for Subdiffraction Photolithography*", Science, 2009, 324 (5929), pp. 913-917).

The use of a photosensitizer is limiting due to cost, material compatibility with increasingly diverse photoresin systems, and the kinetic complexities of multi-component chemical reactions with photosensitizer reacting with triplet oxygen to form singlet oxygen, and then singlet oxygen reacting with quencher. Simplification of this system would be highly beneficial to remediate these deficiencies. Direct excitation is one way to simplify this process by eliminating the need of a photosensitizer. In this method, light of a specific wavelength, for example typically 765 nm, 1064 nm, or 1273 nm wavelength light, will cause the photoexcitation of triplet oxygen to the singlet state. Light having a wavelength of 765 nm is more favorable due to widely available light sources and avoidance of being within the absorbance band of water. And for the sake of brevity, the present disclosure will refer to 765 nm as the wavelength of choice, but it will be understood that this wavelength of light is but one of several different wavelengths that is able to cause the desired photoexcitation of triplet oxygen to the singlet state, and therefore the present disclosure is not limited to use with only one specific wavelength of light. Additional background and benefits of this simplification applied specifically to photodynamic therapy can be found in the work of Bregnhøj et al. and citations therein ("*Direct 765 nm optical excitation of molecular oxygen in solution and in single mammalian cells*", J. Phys. Chem. B, 2015, 119 (17), pp. 5422-5429).

The benefits of direct excitation and spatial temporal control of oxygen has yet to be introduced to the manufacturing realm. Unpatterned light can be used to directly excite ambient oxygen within a photoresin to singlet oxygen which can then be subsequently removed by a quencher allowing thin, large area photoresins previously needing to be cured under inert atmosphere to be done under ambient conditions. There are additional benefits for additive manufacturing where both the simplified chemical process and spatial temporal control of light can be leveraged.

SUMMARY

This section provides a general summary of the disclosure, and is not a comprehensive disclosure of its full scope or all of its features.

In one aspect the present disclosure relates to a method for performing a three dimensional (3D) printing process. The method may comprise generating a primary light beam having a wavelength sufficient to initiate polymerization of a photoresin, and then patterning the primary light beam into patterned primary beam. The method may also include directing the patterned primary beam toward an ultraviolet (UV) or visible light sensitive photoresin to initiate polymerization of select areas of the photoresin. The method may further involve illuminating the photoresin with a secondary light beam having a wavelength of about 765 nm to stimulate triplet oxygen into singlet oxygen. Singlet oxygen subsequently reacts with a quencher to eliminate its reactivity. This controls oxygen inhibition in select areas to enable uninhibited polymerization until additional oxygen diffuses in.

In another aspect the present disclosure relates to a method for performing a three dimensional (3D) printing process to form a 3D part. The method may comprise generating a primary light beam having a wavelength sufficient to initiate polymerization of a photoresin. The method may further comprise using a controller to control a digital mask to pattern the primary light beam into patterned primary beam, and directing the patterned primary beam toward an ultraviolet (UV) or visible light sensitive photoresin contained in a photoresin bath. The method may also involve using the patterned primary beam to initiate polymerization of select areas of the photoresin, and either simultaneously or intermittently illuminating the photoresin with a secondary light beam having a wavelength of about 765 nm. The secondary light beam stimulates triplet oxygen into singlet oxygen, which subsequently reacts with a quencher eliminating oxygen inhibition in select areas. This enhances control of the polymerization in the additional areas bordering the select areas, which assists in forming the 3D part.

In still another aspect the present disclosure relates to a system for performing a three dimensional (3D) printing process to form a 3D part. The system may include a beam delivery system for generating a primary light beam having a wavelength sufficient to initiate polymerization of a photoresin. A digital mask is included for patterning the primary light beam into a patterned primary beam adapted to initiate polymerization of selected areas of a quantity of light responsive photoresin. A controller is included and is configured to control the digital mask to pattern the primary light beam into the patterned primary beam. A photoresin bath holds the quantity of the photoresin. A portion of the quantity of the photoresin in the photoresin bath receives the patterned primary beam to enable polymerization of select areas of the quantity of the photoresin. A secondary light source is included for generating a secondary light beam directed at the quantity of the photoresin. The secondary light beam has a wavelength of about 765 nm to stimulate triplet oxygen into singlet oxygen, to thus control oxygen inhibition in additional areas bordering the select areas. This enhances control of the polymerization in the additional areas bordering the select areas, to thus assist in forming the 3D part.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Corresponding reference numerals indicate corresponding parts throughout the several views of the drawings.

FIG. 1 is high level block diagram drawing of one embodiment of a system in accordance with the present disclosure;

FIGS. 2a and 2b represent illustrations showing areas making up images where the white area represent those select areas of the photoresin in a photo resin bath that are being illuminated with the patterned primary beam, and thus being subjected to polymerization, and the black areas are those areas that are not being illuminated by the patterned primary beam; and FIGS. 3a and 3b are the counterpart illustrations to FIGS. 2a and 2b where a secondary beam of 765 nm light is also being directed over the photo resin bath and causes controlled oxygen inhibition at the grey areas which include the white areas, and can extend beyond or be separated. The grey areas help to control polymerization inhibition to produce enhanced feature detail and resolution of the select areas under going polymerization.

DETAILED DESCRIPTION

Example embodiments will now be described more fully with reference to the accompanying drawings.

As discussed by Wilkinson et al. ("*Rate Constants for the Decay and Reactions of the Lowest Electronically Excited Singlet State of Molecular Oxygen in Solution. An Expanded and Revised Compilation*", Journal of Physical and Chemical Reference Data 24.2, (1995), pp. 663-677) and demonstrated by Bregnhøj et al. ("*Direct 765 nm Optical Excitation of Molecular Oxygen in Solution and in Single Mammalian Cells*", The Journal of Physical Chemistry B 119.17, (2015), pp. 5422-5429) there are optical techniques to stimulate, via light, the creation of singlet oxygen from triplet oxygen without the use of a photosensitizer. With 765 nm light, triplet oxygen can be directly stimulated to its singlet state, allowing patterning of the oxygen reactive state and gaining finer spatial and temporal control over its effects and chemistries. This allows replacement of nitrogen boxes by 765 nm light sources for broad area applications such as coatings, eliminating high pressure gases and plumbing, and significantly simplifying an optical patterning process. Patterning of the oxygen reactive state by using 765 nm light by direct stimulation also eliminates the need for a photosensitizer. As a result, using light directly can lower costs. Patterning the light allows spatial temporal control in applications like 3D photolithography and micro/nanofabrication. Patterning of singlet oxygen enables control over inhibition, thus allowing increased network density or a gradient of material network density to be achieved. This is highly useful for creating supporting material within builds such as under arches, hierarchical materials and metamaterials. The control of polymerization inhibition by spatial temporal light processes has been shown in the work of Scott et al. to increase the resolution of micro/nanofabrication ("*Two-Color Single-Photon Photoinitiation and Photoinhibition for Subdiffrac-* tion Photolithography", Science, 2009, 324 (5929), pp. 913-917). While Scott et al. used spatial temporal control of inhibition, use of 765 nm light and oxygen quenching can be thought of as the negative or complementary technique, removing inhibition in select areas to achieve the same effect. Another use of light patterning is the spatial patterning of singlet oxygen initiated chemistries, among other applications ("*Photosensitized singlet oxygen and its applications*", Coord. Chem. Rev. 2002, 233-234, pp. 351-371).

Spatial light modulators (SLMs) can modulate a light beam to project a 2D image made up of higher intensity and lower intensity light. The spatial light modulator may be equipped with one or multiple light sources allowing quickly modulating between differing wavelengths, and patterned so as to seemingly combine the different wavelength optical beams into what appears to be a single image to the human eye. These spatial light modulations are on the order of chemical diffusion, so they can be used to control the polymerization front for photoresist based manufacturing.

Projection stereolithography uses SLMs and computer aided design to build 3D parts from a photoresin using a sequence of projected 2D images. Using 765 nm light with such a system eliminates the need for a photosensitizer for oxygen control, as well as the need for nitrogen boxes. Thus, spatial temporal control of oxygen reactions can be achieved without these otherwise required components.

FIG. 1 depicts a typical PuSL system 10 with a 765 nm light source 12 controlled by computerized controller 11. The system 10 may also include a 3D CAD modeling system 14, spatial light modulator 15 which forms part of a digital mask 16, a primary beam delivery system 18, a mirror 20, a projection lens 22, a UV curable resin bath 24 filled with a UV curable resin (i.e., "photoresin") 26, and an elevator 28 for supporting a part thereon and moving the part into and out from the resin bath 24. Components 12, 14, 15, 16, 18 and 28 may be in communication with the controller 11 and controlled in full or in part by the controller to carry out an optical patterning and/or optical manufacturing process, for example for making a 3D part in an additive manufacturing operation. As each layer of a 3D part is formed, the elevator 28 may be lowered further into the photo resin 26 to form successive layers. In this example the light source 12 is depicted as generating red light which represents a secondary light beam 12a. The spatial light modulator 15 may be controlled by the controller 11 and used for modulating a primary beam 18a which becomes a patterned primary beam 18b, and which is directed at the photoresin 26 to initiate polymerization of selected portions of the photoresin that the illuminated portions of the patterned primary beam 18b impinge. Spatial light modulator 15 may also be controlled by the controller 11 to modulate the 765 nm light beam to form the secondary light beam 12a, which stimulates triplet oxygen to its singlet state, thus allowing patterning of the oxygen reactive state and gaining finer spatial and temporal control over its effects and chemistries. More specifically, the stimulating of triplet oxygen to its singlet state enables suppression of the polymerization inhibition of the photoresin at select areas to enable significantly enhanced resolution and detail of features of the 3D part being made using the system 10. Each layer of a 3D part may be formed one layer at a time by using the patterned primary beam 18b and the secondary light beam 12a, rather than by rastering scanning a beam back and forth over the photoresin 26, which significantly reduces the time needed to produce a 3D part.

It will also be appreciated that the single spatial light modulator 15 may incorporate suitable and conventional multiplexing hardware and/or software which multiplexes the two beams 12a and 18b (i.e., switches one off and the other on, and vice versa). The multiplexing may be performed as rapidly as needed to achieve the needed optical patterning and oxygen inhibition.

The system 10 is fundamentally different from previously developed systems and methods for microstereolithography because the system and method does not require the use of a nitrogen box for encasing the photoresin 26 to control oxygen inhibition. Nor does the system 10 and method of the present disclosure require adding a photosensitizer molecule to control oxygen inhibition. With the present system 10, the 765 nm secondary light source 12, and the secondary light beam 12a that it produces, allows generation and removal of singlet oxygen which affords greater control over the polymerization process providing the spatial temporal control needed to achieve increased feature resolution and definition for the patterned part (or possibly a patterned coating).

FIGS. 2a, 2b, 3a and 3d show two sets of example images. Image 100 of FIG. 2a and image 104 of FIG. 3a represent the typical patterned primary beam 18b image where the white area 100a is and where white area 104a is. The patterned primary beam 18b, in this example comprising 400 nm light, impinges the photoresin 26 and causes polymerization to form a solid while the black areas 100b and 104b are negative, representing those areas of the patterned primary beam 18b where little to no light is present, and thus no solid forms in the black areas 100b and 104b (i.e., no polymerization occurs and thus the photoresin 26 is unaffected). Image 102 of FIG. 2b and image 106 of FIG. 3b represent the enhanced oxygen inhibition versions of images 100 and 104, respectively. The white area 102a in FIG. 2b and the white area 106a in FIG. 3b each represent the patterned primary light beam 18b (for example, a 400 nm beam) which initiates polymerization of select areas of the photoresin 26. The grey areas 102c and 106c each represent the outer boundaries of the secondary light beam 12a, which appears as outlines, and which each represent the oxygen inhibition beam (i.e., 765 nm), which in each example lies over the white areas 102a/106a and extends beyond the perimeter of each of the white areas 102a/106a. The outlines marked as grey areas 102c and 106c create additional areas which may be viewed as "oxygen depletion" zone areas. The secondary light beam 112a may be provided continuously or intermittently. Black areas 102b and 106b represent "negative" areas where little or no light is present in the patterned primary beam 18b, and thus no polymerization or change in oxygen occurs. The patterned primary beam 18b may have a wavelength of 400 nm or it may have a number of other wavelengths, typically smaller than 400 nm, for example 380 nm, 365 nm, or even 280 nm.

The system 10 and method of the present invention is ideally suited for use in manufacturing operations to control oxygen diffusion, network density, and photosensitivity of a photoresin. Anticipated applications include, but are not limited to, the fabrication of metamaterials, smart sensors, tissue scaffolds and also in coatings.

The foregoing description of the various embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for performing a three dimensional (3D) printing process to form a 3D part, the system including:
    a beam delivery system for generating a primary light beam having a wavelength sufficient to initiate polymerization of a photoresin;
    a digital mask for patterning the primary light beam into a patterned primary beam adapted to initiate polymerization of selected areas of a quantity of light responsive photoresin;
    a controller configured to control the digital mask to pattern the primary light beam into the patterned primary beam;
    a photoresin bath for holding the quantity of the photoresin, a portion of the quantity of the photoresin in the photoresin bath receiving the patterned primary beam to enable polymerization of select areas of the portion of the quantity of the photoresin; and
    a secondary light source for generating a secondary light beam directed at the quantity of the photoresin, the secondary light beam forming a patterned beam having a wavelength of about 765 nm to stimulate triplet oxygen into singlet oxygen only in select additional areas of the photoresin that are not to be polymerized, and which border areas to be polymerized, to thus control oxygen inhibition in the select additional areas bordering the areas to be polymerized, to enhance control of the polymerization in the additional areas bordering the select areas, to assist in forming the 3D part.

2. The system of claim 1, further comprising a 3D computer aided design system for interfacing with the controller and providing the controller information used to help form the patterned primary beam.

3. The system of claim 1, further comprising an elevator configured to lower a layer of the photoresin which has been acted on by the patterned primary beam and the secondary light beam and turned to a solid, further into the photoresin bath, to thus expose an additional quantity of the photoresin to be used to form a subsequent layer of the 3D part.

4. The system of claim 3, wherein the elevator is controlled by the controller to successively lower the elevator, step by step, further into the photoresin bath as each layer of the 3D part is formed.

5. The system of claim 1, further including a spatial light modulator for controlling the beam delivery system.

6. The system of claim 1, further including a spatial light modulator for controlling the secondary light source.

7. A system for performing a three dimensional (3D) printing process to form a 3D part, the system including:
    a beam delivery system including a spatial light modulator for generating a primary light beam having a wavelength sufficient to initiate polymerization of a photoresin;
    a mask for patterning the primary light beam into a patterned primary beam adapted to initiate polymerization of selected areas of a quantity of light responsive photoresin;
    a controller configured to control the mask to pattern the primary light beam into the patterned primary beam;

a photoresin bath for holding the quantity of the photoresin, a portion of the quantity of the photoresin in the photoresin bath receiving the patterned primary beam to enable polymerization of select areas of the quantity of the photoresin;

an elevator configured to lower a newly formed layer of a 3D part deeper into the photoresin bath to enable formation of a subsequent layer; and a secondary light source for generating a secondary light beam directed at the quantity of the photoresin, the secondary light beam forming a patterned secondary light beam having a wavelength including at least one of 765 nm, 1064 nm or 1273 nm, selected to stimulate triplet oxygen into singlet oxygen only in select additional areas of the photoresin that are not to be polymerized, and also which border areas to be polymerized, to thus control oxygen inhibition in the select additional areas bordering the select areas, to enhance control of the polymerization in the additional areas bordering the select areas, to assist in forming the 3D part.

8. The system of claim 7, wherein the mask comprises a digitally controlled mask.

9. The system of claim 7, further comprising a 3D computer aided design configured to provide information to the controller for use in generating the patterned primary beam.

10. The system of claim 7, wherein the wavelength of the secondary beam is selected to be 765 nm.

11. The system of claim 7, wherein the patterned primary beam comprises a wavelength between 270 nm and 400 nm.

12. The system of claim 7, wherein the primary light beam comprises a wavelength of at least one of: 380 nm; 365 nm; or 280 nm.

13. The system of claim 7, wherein the elevator is controlled so as to be successively lowered, step by step, further into the photoresin bath as each layer of the 3D part is formed.

14. The system of claim 13, wherein the elevator is controlled by the controller.

15. A system for performing a three dimensional (3D) printing process to form a 3D part, the system including:

a beam delivery system including a spatial light modulator for generating a primary light beam having a wavelength sufficient to initiate polymerization of a photoresin;

a mask for patterning the primary light beam into a patterned primary beam adapted to initiate polymerization of selected areas of a quantity of light responsive photoresin;

a controller configured to control the mask to pattern the primary light beam into the patterned primary beam having a wavelength of between 270 nm and 400 nm;

a photoresin bath for holding the quantity of the photoresin, a portion of the quantity of the photoresin in the photoresin bath receiving the patterned primary beam to enable polymerization of select areas of the quantity of the photoresin; and a secondary light source for generating a secondary light beam directed at the quantity of the photoresin, the secondary light beam forming a patterned secondary light beam having a wavelength of one of 765 nm, 1064 nm or 1263 nm, to stimulate triplet oxygen into singlet oxygen only in select additional areas of the photoresin that are not to be polymerized, and which border areas to be polymerized, to thus control oxygen inhibition in additional areas bordering the select areas, to enhance control of the polymerization in the additional areas bordering the select areas, to assist in forming the 3D part.

16. The system of claim 15, further comprising an elevator configured to lower a newly formed layer of a 3D part deeper into the photoresin bath to enable formation of a subsequent layer.

17. The system of claim 16, wherein the elevator is controlled by the controller.

18. The system of claim 15, wherein the mask comprises a digital mask.

19. The system of claim 15, wherein the primary light beam comprises a wavelength of at least one of: 380 nm; 365 nm; or 280 nm.

* * * * *